United States Patent [19]

Tahira et al.

[11] Patent Number: 5,168,569
[45] Date of Patent: Dec. 1, 1992

[54] BUS CONTROL SYSTEM FOR SHORTENING BUS OCCUPATION TIME

[75] Inventors: Fumiaki Tahira, Yokohama; Kazuo Sumitani; Kenji Fujisono, both of Kawasaki; Keiko Kawasaki, Tokyo; Yoso Igi, Kawasaki, all of Japan

[73] Assignee: Fujitsu Limited, Kawasaki, Japan

[21] Appl. No.: 654,755

[22] Filed: Feb. 13, 1991

[30] Foreign Application Priority Data

Feb. 13, 1990 [JP] Japan ................ 2-032260

[51] Int. Cl.5 ........................................... G06F 13/366
[52] U.S. Cl. ....................... 395/725; 395/325; 364/DIG. 1; 364/240.9; 364/241.1; 364/242.92
[58] Field of Search ................ 364/200; 395/775, 725

[56] References Cited

U.S. PATENT DOCUMENTS

| | | | |
|---|---|---|---|
| 4,228,496 | 10/1980 | Katzman et al. | 395/200 |
| 4,426,679 | 1/1984 | Yu et al. | 395/275 |
| 4,888,684 | 12/1989 | Lija et al. | 395/325 |

FOREIGN PATENT DOCUMENTS 62-209653 9/1987 Japan.

*Primary Examiner*—Dale M. Shaw
*Assistant Examiner*—Lance L. Barry

[57] ABSTRACT

A bus control system for controlling intermultiprocessor communication by polling, comprising a listener response signal line for transferring an end answer signal from a listener circuit to a talker circuit immediately when the transfer of data between the talker and the listener is finished, without waiting for the completion of data transfer within the receiving processor, whereby the bus occupation period is shortened.

8 Claims, 7 Drawing Sheets

BUS CONTROL SYSTEM FOR SHORTENING BUS OCCUPATION TIME

BACKGROUND OF THE INVENTION

(1) Field of the Invention

The present invention relates to a bus control system having a plurality of processors respectively including inter-multiprocessor controllers (hereinafter also referred to as IPCs) connected to a communication bus, for controlling inter-multiprocessor communication by polling from an inter-multiprocessor bus controller.

In recent years, data processing systems have been used which have a plurality of processors connected to each other by a communication bus and carrying out different proceedings so that necessary data are transferred through the bus and received for common use.

When such a communication among a plurality of processors is to be carried out, a system is known in which the respective processors are sequentially interrogated by polling to determine whether or not a bus-use requirement is present.

(2) Description of the Related Art

In a conventional art, the communication bus is occupied by one IPC of a talker during a period from the issuance of the allowance signal to use the communication bus to the generation of the completetion notification of the data transfer from the IPC of the talker, and the occupation period includes data transfer from an IPC in a listener to a main memory in the listener by a direct memory access control. The data transfer within the listener, however, does not need to use the communication bus between the talker and the listener but only needs the data bus within the listener. Therefore, the period of occupying the communication bus in the conventional art is too long and the efficiency in using the communication bus is bad. The communication bus is commonly used by a number of processors. Therefore, if the period occupied for one time of use of the bus is too long, a negative influence is had on the processing ability of the multi-processor system. In particular, along with developments in the processing speed of processors, there is a problem in that the processing ability of the total system is deteriorated if the time for data transfer between processors is too long.

SUMMARY OF THE INVENTION

The present invention has an object to provide a communication system among a plurality of processors in which the period the communication bus is occupied is shortened so that the efficiency in using the bus is improved.

To attain the above object, there is provided, according to the present invention, a new and improved bus control system having a plurality of processors respectively connected to a communication bus, for controlling inter-multiprocessor communication by polling. The bus control system according to the present invention comprises a listener response signal line and a completion signal line provided as bus control signal lines in the communication bus. Each of the processors comprises a main memory for storing data, a central control unit, and an inter-multiprocessor controller having a talker circuit and a listener circuit. The bus control system comprises a data transferring unit, for transferring data from the talker circuit in one of the processors to the listener circuit n another one of the processors through the communication bus; an end answer signal transferring unit, for transferring an end answer signal from the listener circuit to the talker circuit through the listener response signal line when the transfer of data by the data transferring unit is finished; a bus occupation releasing unit, for releasing the communication bus from being occupied by the talker circuit when the end answer is received by the talker circuit; a received data transferring unit, for transferring the received data within the receiving processor from the listener circuit to the main memory after the end of the data transfer from the talker circuit in one of the processors to the listener circuit in another one of the processors through the communication bus; and a transfer complete signal transferring unit, for transferring a transfer complete signal from the listener circuit to the talker circuit through the completion signal line, and from the inter-multiprocessor controller to the central control unit within the listener circuit.

It is preferable that the bus control system further comprises an inter-multiprocessor bus controller, operatively connected through the communication bus to the plurality of processors, for generating a polling signal for sequentially designating the identification numbers of the plurality of processors without stopping even when the communication bus is occupied by one of the processors.

It is preferable that the transfer complete signal transferring unit is included in the listener circuit, and the transfer complete signal is generated when the polling signal coincides with the identification number of the listener circuit.

It is also preferable that each of the processors comprises a transfer complete signal detecting unit for detecting the transfer complete signal transferred from the listener through the completion signal line. The transfer complete signal is detected when the polling signal coincides with the identification number of the listener.

It is also preferable that each of the processors comprises a transfer request signal generating unit for generating a transfer request signal when there is a request to transfer at the time the processor is polled.

It is also preferable that the inter-multiprocessor controller comprises a unit for generating a use-allowance signal in response to the transfer request signal unless another processor occupies the communication bus. The use-allowance signal is supplied to the processor generating the transfer request signal. The use-allowance signal continues until the transfer request signal is withdrawn in response to the generation of the end answer signal.

It is also preferable that each of the processors comprises a listener designating unit for designating one of the processors as a listener, when the processor receives the use-allowance signal from the inter-multiprocessor bus controller.

It is also preferable that each of the processors comprises a receive-ready signal generating unit for generating a receive-ready signal in response to the listener designation.

It is also preferable that the received data transferring unit comprises a direct memory access controller for transferring data by direct memory access control.

BRIEF DESCRIPTION OF THE DRAWINGS

The above object and features of the present invention will be more apparent from the following description of the preferred embodiment with reference to the drawings, wherein.

DESCRIPTION OF THE PREFERRED EMBODIMENT

For better understanding of the present invention, a conventional bus control system is first described with reference to FIG. 1 to FIG. 3.

Figure 1:
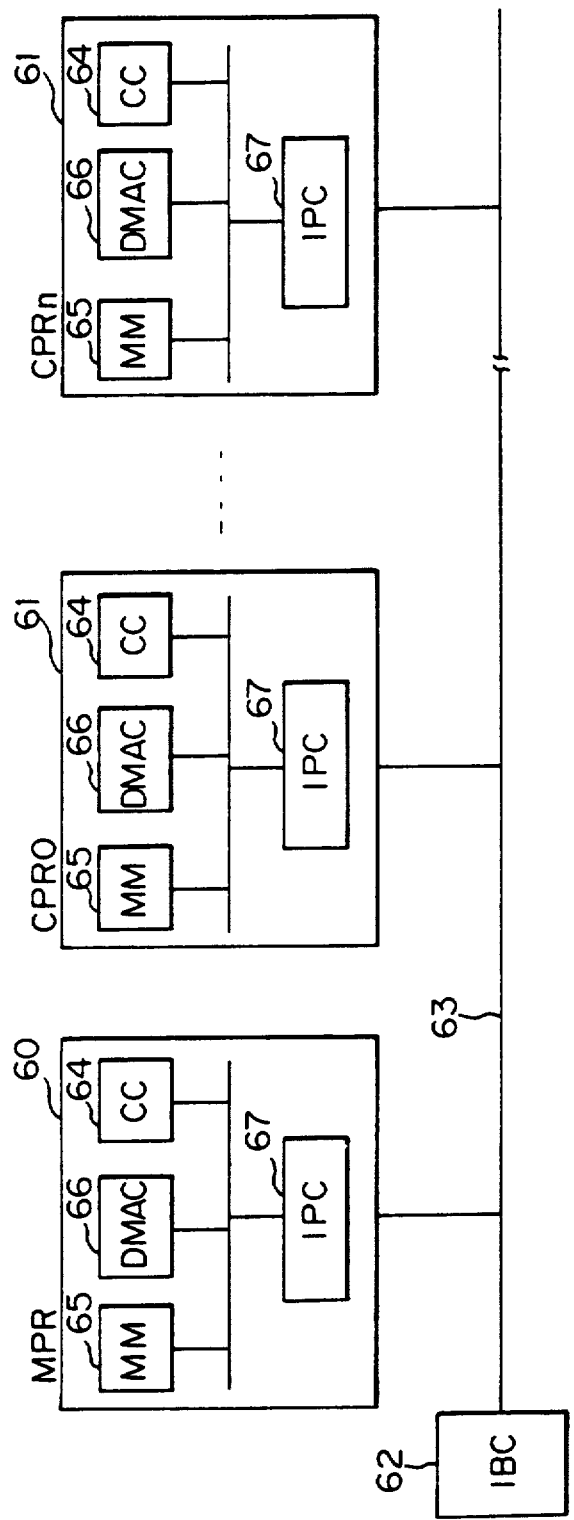
FIG. 1 is a general construction diagram showing a conventional bus control system for explaining the background of the present invention.
Figure 2A:
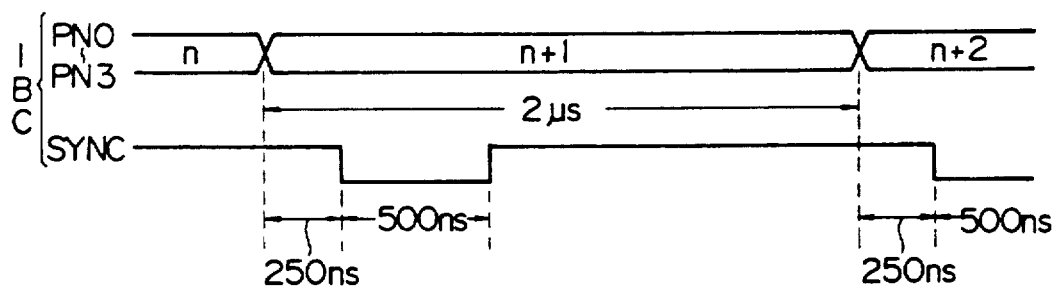
FIG. 2A is a conventional bus control sequence when no request for communication is present.
Figure 2B:
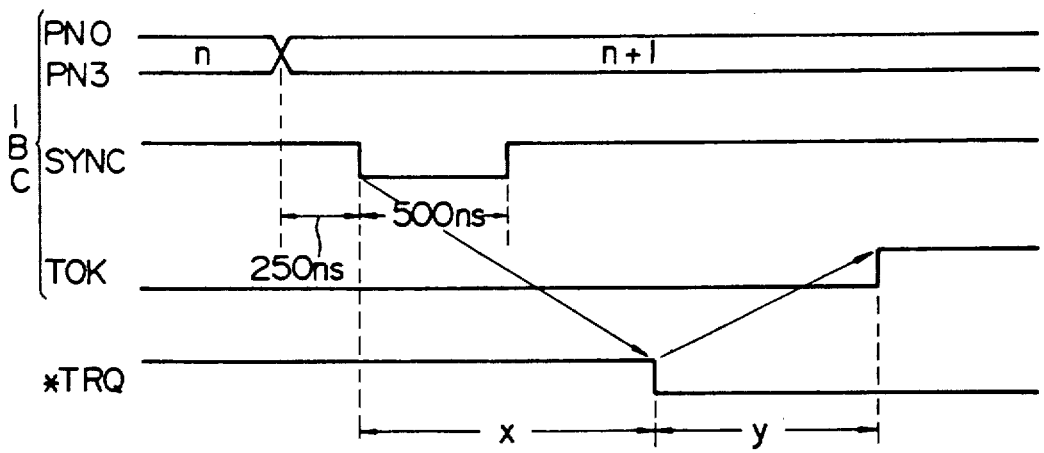
FIG. 2B is a conventional bus control sequence when a request for communication is present.

FIG. 1 is a construction diagram of a bus control system as a background of the present invention, and FIG. 2A and 2B are operation sequences in the conventional bus control system.

FIG. 1 shows a system construction of a conventional digital exchange of a multi-processor system, in which 60 represents a management processor MPR for controlling the total system; 61 is a plurality of call processors CPR0 to CPRn which are independent processors for respectively controlling the networks under their control; 62 is an inter-multiprocessor bus controller (hereinafter referred to as IBC) for controlling the communication by the processors 60 and 61; and 63 is a communication bus (referred to as C Bus) constructed of lines for transmitting data between each processor and the IBC or various control signals.

In each of the processors 60 and 61, a central processing unit (CC) 64, a main memory (MM) 65, a direct memory access control unit (hereinafter referred to as DMAC) 66, and an inter-multiprocessor controller (IPC) 67, are provided.

Conventionally, communication is carried out among the IPCs 66 in such a way that the processors, each comprising a central processing unit (CC) 64, a main memory (MM) 65, a DMAC 66, and an IPC 67, are connected to each other through the communication bus 63, and their rights to use the communication bus 63 are controlled by the IBC 62. The IPC 67 in each processor comprises a transmitting mechanism called a talker and a receiving mechanism called a listener, which are respectively connected through the communication bus 63 to the IBC 62 to control the rights to use the communication bus 63 and connected through the communication bus 63 to the other IPCs 67 to transmit or receive data. The transmitting or receiving data are stored in a buffer memory in each IPC 67. The DMAC 66 in the processor carries out a transfer control of the transmitting or receiving data between the main memory MM 65 and the buffer memory in the IPC 67.

FIGS. 2A and 2B show the conventional bus control sequence in the conventional system shown in FIG. 1. The communication bus 63 (see FIG. 1) is provided with a plurality of control lines and data lines. In the control line, polling lines are included. In this example, four polling lines represented by PN0–PN3 are provided. By the combination of the two-value signals of the four lines, $2^4 = 16$ units are designated. Namely, in the inter-multiprocessor bus controller (IBC) 62 (see FIG. 1), by changing the signal of the polling lines, 16 IPCs (corresponding to the processors) are sequentially designated.

FIG. 2A shows the case when there is no communication request, and FIG. 2B shows the case when there is a communication request.

In the case of FIG. 2A, after a numeral n is designated by the polling lines PN0–PN3, when a numeral n+1 is designated, if the IPC in which the number of n+1 is set does not generate a communication request, no signal is supplied to the inter-multiprocessor bus controller (IBC) 62. In contrast, in the case of FIG. 2B, when the talker in the IPC 67 in which the number n+1 is set generates a request signal *TRQ to use the communication bus 63, the inter-multiprocessor bus controller (IBC) 62 outputs an allowance signal TOK to use the communication bus 63 to the IPC 67 in question. When the IPC 67, which has generated the request to use the communication bus 63, detects the allowance signal, the IPC 67 in question recognizes that it has obtained the right to use the communication bus 63.

In the construction shown in FIG. 1 in which the bus-use right is obtained in the above-mentioned way, how the operation of data transmission or reception is effected is explained with reference to FIG. 3. In FIG. 3, MM, CC, and IPC shown in the left side are units belonging to the processor at the talker side which is going to transmit data; and MM, CC, and IPC shown in the right side are units belonging to the processor at the receiver side which is going to receive data.

First, in the processor 60 at the transmitting side (talker side), the central processing unit CC 64 in the transmitting side processor sets data for transfer control in the DMAC 66, and sets a listener number (LNR) representing a processor which is an opposite one for communication. Subsequently, a transmission order (instruction) is supplied to the IPC 67 in its own processor 60 to activate the talker (transmitting mechanism). Next, data for communication is transferred from the main memory MM 65 to a buffer memory (not shown) in the IPC 67 under the control of the DMAC 66. In this example, one to 512 words are transferred by one transfer sequence.

When data is stored in the buffer memory of the talker in the IPC, a request TRQ to use the communication bus is output from the IPC to the IBC 62. The control of the bus-use right at this time is, as explained with reference to FIG. 2A, effected in such a way that, when the number of its own unit is designated by polling, the request TRQ to use the communication bus is accepted by the IBC. In response to this, a use allowance signal is generated from the IBC 62. Then, a predetermined signal LN (listener number) representing the number of an IPC at the receiving side is output through data lines to the communication bus.

On the other hand, in the IPC a the receiving side, DMAC data is set in advance and a receive order is given from a processing unit CC at the receiving side to be in an activation state. In this state, when the listener in the designated IPC detects its own number LN transmitted from the transmitting side IPC (talker), the listener responds with a receive ready complete signal RDY. When the IPC (talker) receives this, a transmission of data stored in the buffer memory in the talker is started. Conventionally, even when the data transfer from the IPC at the talker side to the IPC at the listener side is completed, the right to use the bus is not released.

The data received by the IPC (listener) through this transmission is then transferred by the receiving side DMAC to the main memory MM. When the data transfer to the main memory MM is finished, the IPC (listener) informs an end answer through the data line to the IPC (talker) at the transmitting side.

When the IPC (talker) receives this end answer information, it informs the processing unit (CC) in its own processor of a completion notification CPLT, and releases the bus-use request TRQ which is informed to the IBC. The IBC detects this so that it can use the communication bus 63 for communication by another processor.

Figure 3:
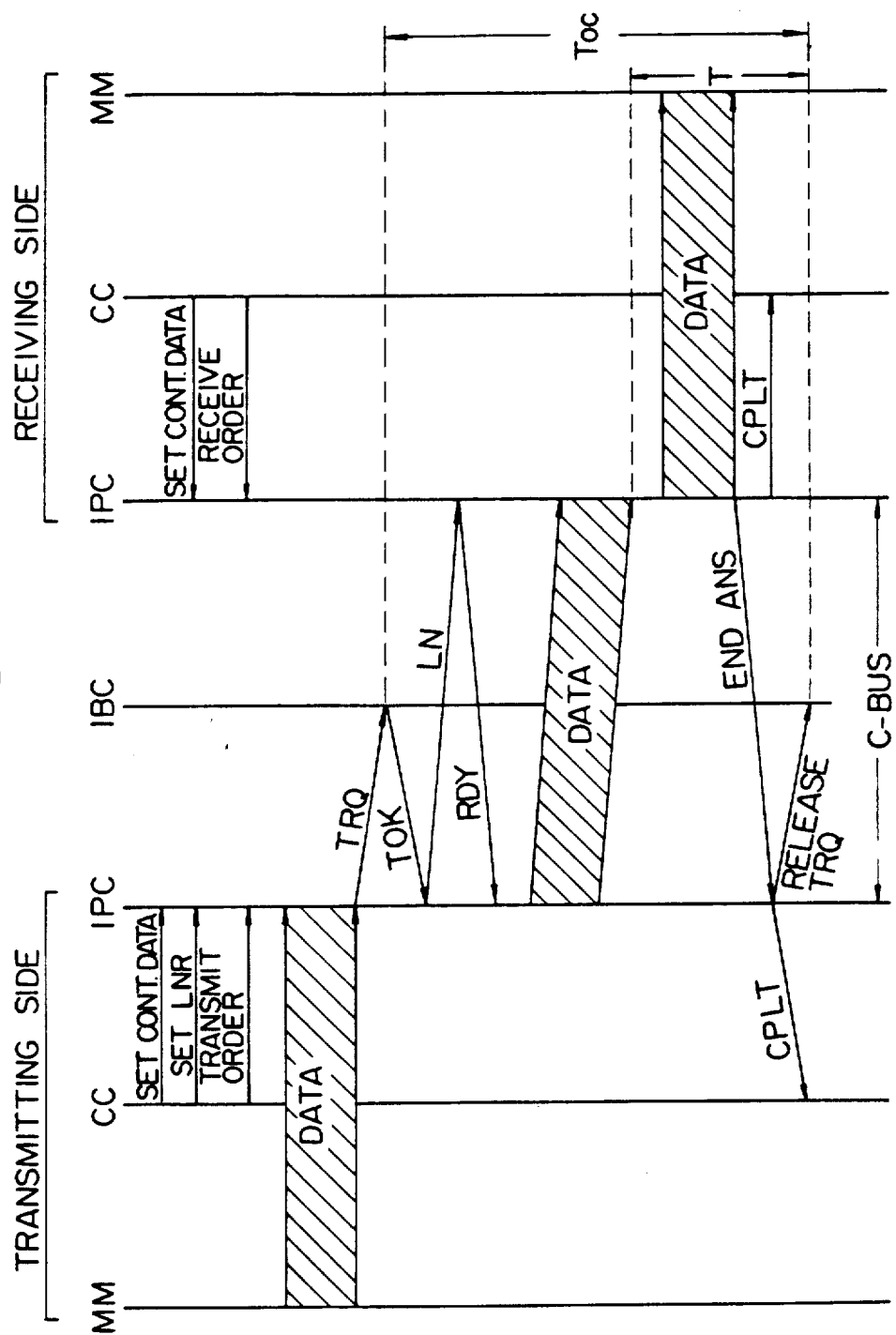
FIG. 3 is a diagram showing an operation sequence of a conventional inter-multiprocessor communication;.

In a conventional example, in the operation sequence shown in FIG. 3, the communication bus is occupied by one IPC (talker) during a period Toc from the issuance of the allowance signal TOK to use the communication bus to the generation of the completetion notification CPLT from the IPC (talker). In this period Toc, the communication bus is not actually used in a period T from the end of the data transfer between IPCs to the end of the data transfer within the receiving side processor. Therefore, the occupation period Toc is too long and the efficiency in using the communication bus is bad. The communication bus is commonly used by a number of processors. Therefore, if the period occupied by one time of use of the bus is too long, a negative influence is had on the processing ability of the multiprocessor system. In particular, along with developments in the processing speed of processors, there is a problem in that the processing ability of the total system is deteriorated if the time for data transfer between processors is too long.

The present invention has an object to provide a communication system among a plurality of processors in which the period the communication bus is occupied is shortened so that the efficiency in using the bus is improved.

An embodiment of the present invention is described in the following.

FIG. 4A to FIG. 4G show a time chart for explaining the principle of the present invention.

Although it is not shown in FIG. 4A to FIG. 4G, in the present invention also, similarly to the conventional example, a plurality of processors are connected respectively through the inter-multiprocessor controllers (IPCs) to the communication bus, and the bus-use right is obtained by polling from the inter-multiprocessor bus controller (IBC) to carry out the communication among the plurality of processors. Therefore, the genera construction of the bus control system according to the invention is the same as that shown in FIG. 1, so that the same abbreviations such as MM, IPC, CC, DMAC are used in this embodiment also.

Figure 4:
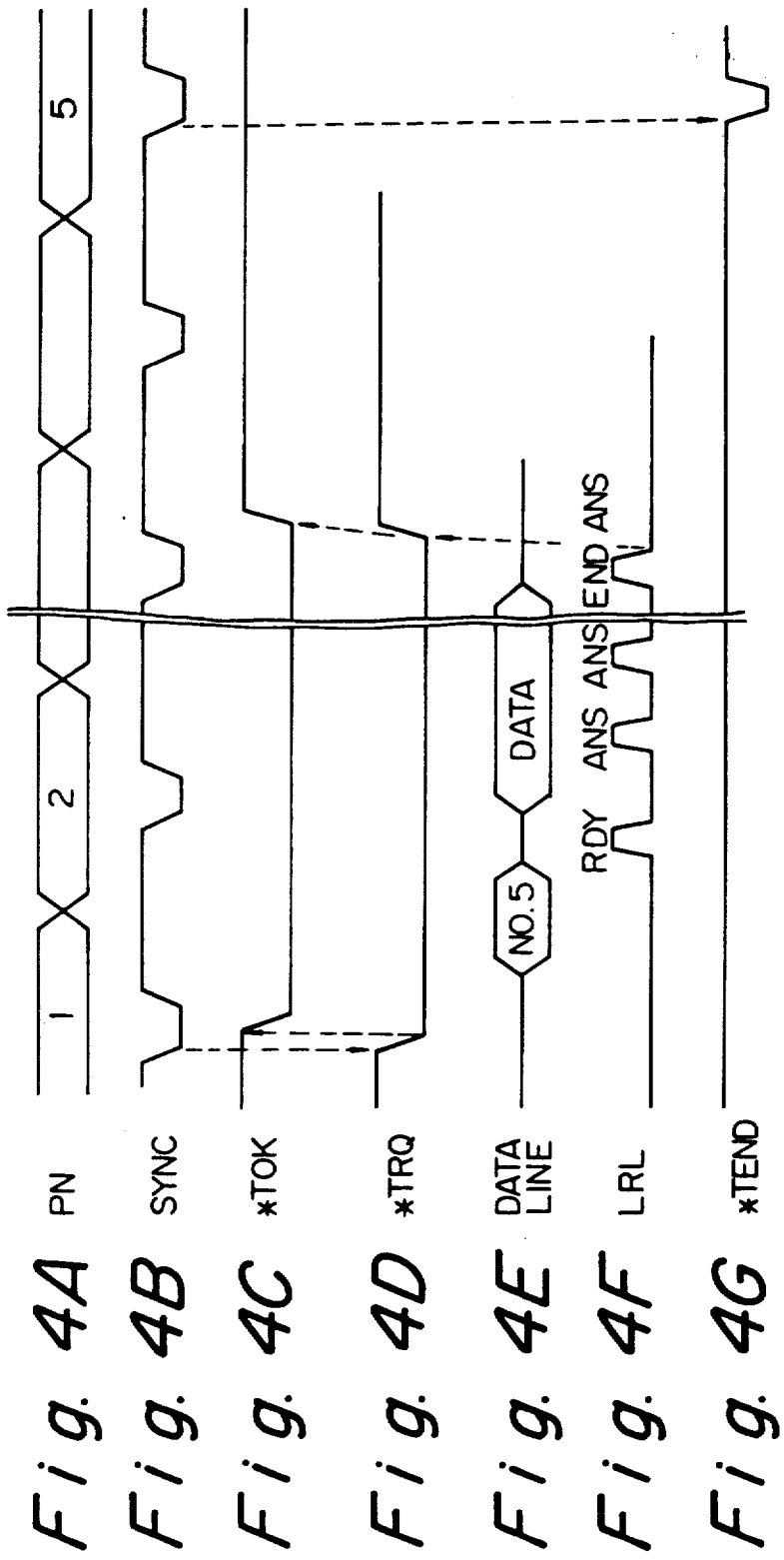
FIG. 4A to FIG. 4G are diagrams showing an operation sequence of an inter-multiprocessor communication according to the present invention.

FIG. 4A shows a polling signal representing a polling number PN, and FIG. 4B shows a synchronization signal SYNC for polling. FIG. 4C shows a bus-use allowance signal *TOK (where * represents a negative logic) generated from the IBC. These signals are transmitted from the inter-multiprocessor bus controller (IBC) to the communication bus. FIG. 4D shows a bus-use request signal *TRQ, and FIG. 4E shows the signals on the data lines in the communication bus. The signals *TRQ and the signals of the data lines are transmitted from the inter-multiprocessor controller IPC at the transmitting side. Next, FIG. 4F shows a signal on a listener response line transmitted from the inter-multiprocessor controller at the receiving side, and FIG. 4G shows a transfer completion signal which appears on a transfer completion signal line after completion of a DMA transfer in the listener from the buffer memory in the listener IPC to the main memory MM.

According to the present invention, the listener response signal line and the transfer completion signal line are provided in the communication bus. The end answer signal is transferred from the listener IPC through the listener response signal line to the talker IPC immediately after the end of the data transfer between the talker IPC and the listener IPC without waiting the end of the data transfer within the listener processor. In response to the end answer, the talker IPC generates a request to release the bus occupation. After the end of the data transfer within the listener processor between the IPC and the main memory, a transfer complete signal is transferred from the listener IPC through the transfer complete signal line to the talker IPC.

The polling signal output from the inter-multiprocessor bus controller IBC to the communication bus continuously designates, as shown in FIG. 4A, the numbers of the respective processors by updating a counter value without stopping in synchronization with the synchronous signal SYNC shown in FIG. 4B. This countinuous updating of the counter value is necessary to ensure that the transfer end signal is generated by the designated listener. In contrast, in the conventional sequence, the update of the counter value is stopped when the communication bus is occupied by any IPC (see FIG. 2B).

Among the inter-multiprocessor controllers IPCs in respective processors, an inter-multiprocessor controller (talker), which wishes to carry out a transmission, outputs the transfer request signal *TRQ as shown in FIG. 4D when its own number is polled. In response to this, the inter-multiprocessor bus controller IBC generates the transfer allowance signal *TOK as shown in FIG. 4C. The inter-multiprocessor controller IPC, which generated the request for communication, enters a state in which the right to use the bus is aquired, when it receives a transfer allowance signal.

The inter-multiprocessor controller IPC in the listener detects the listener designation, and, when the ready for communication state is finished, it outputs a receive ready signal RDY on the listener response lines (plural lines) LRL as shown in FIG. 4F. When the inter-multiprocessor controller IPC in the talker receives this signal RDY, data transfer is carried out between the inter-multiprocessor controllers in the talker and in the listener, as shown in FIG. 4E. The listener informs the listener response line LRL of a response signal ANS every time each data unit is received, as shown in FIG. 4F, and transmits an end answer signal END ANS when the reception of the transferred data is finished.

The end answer signal END ANS is detected by the inter-multiprocessor controller IPC in the talker. Then, the transfer request *TRQ from the talker is released so that the communication bus is released, enabling the other inter-multiprocessor controllers to transfer data therebetween.

After this, the inter-multiprocessor controller IPC in the listener transfers the received data from its buffer memory which stored the received data, to the main memory in the receiving processor by the control of the DMAC. When this transfer is finished, a completion signal *TEND is transmitted to the transfer completion line at the timing when its own (listener) number is designated by the polling signal. The completion signal *TEND is detected in the inter-multiprocessor controller IPC in the talker at the timing of the polling signal of the talker so that the transfer completion is recognized. If the completion signal is not informed to the talker, the talker determines that the data transfer is not normally completed (a data error was generated and so forth), and processings such as retransmission are necessary. According to the present invention, the end answer signal END ANS is transferred from the listener to the talker immediately after receiving the final data from the talker, while the completion signal *TEND is transferred from the listener to the talker after the end of the data transfer in the listener and at the polling timing of the listener.

This transmission timing of the completion signal *TEND is important because, if the completion signal *TEND is transferred simultaneously with the transfer of the end answer signal END ANS, it is impossible for the talker to determine which of the processors has sent the completion signal to the talker even when the talker receives the completion signal *TEND.

The above description of the embodiment of the present invention can be summarized as follows. Namely, after aquiring the right to use the bus, a signal to designate the opposite unit and data are transferred, and, when the communication is finished, an end answer signal END ANS is generated from the inter-multiprocessor controller IPC at the receiving side. When the end answer signal is detected by the inter-multiprocessor controller IPC at the transmitting side, the communication bus is released. Thus, the period that the communication bus is occupied by each inter-multiprocessor controller can be made short.

Figure 5:
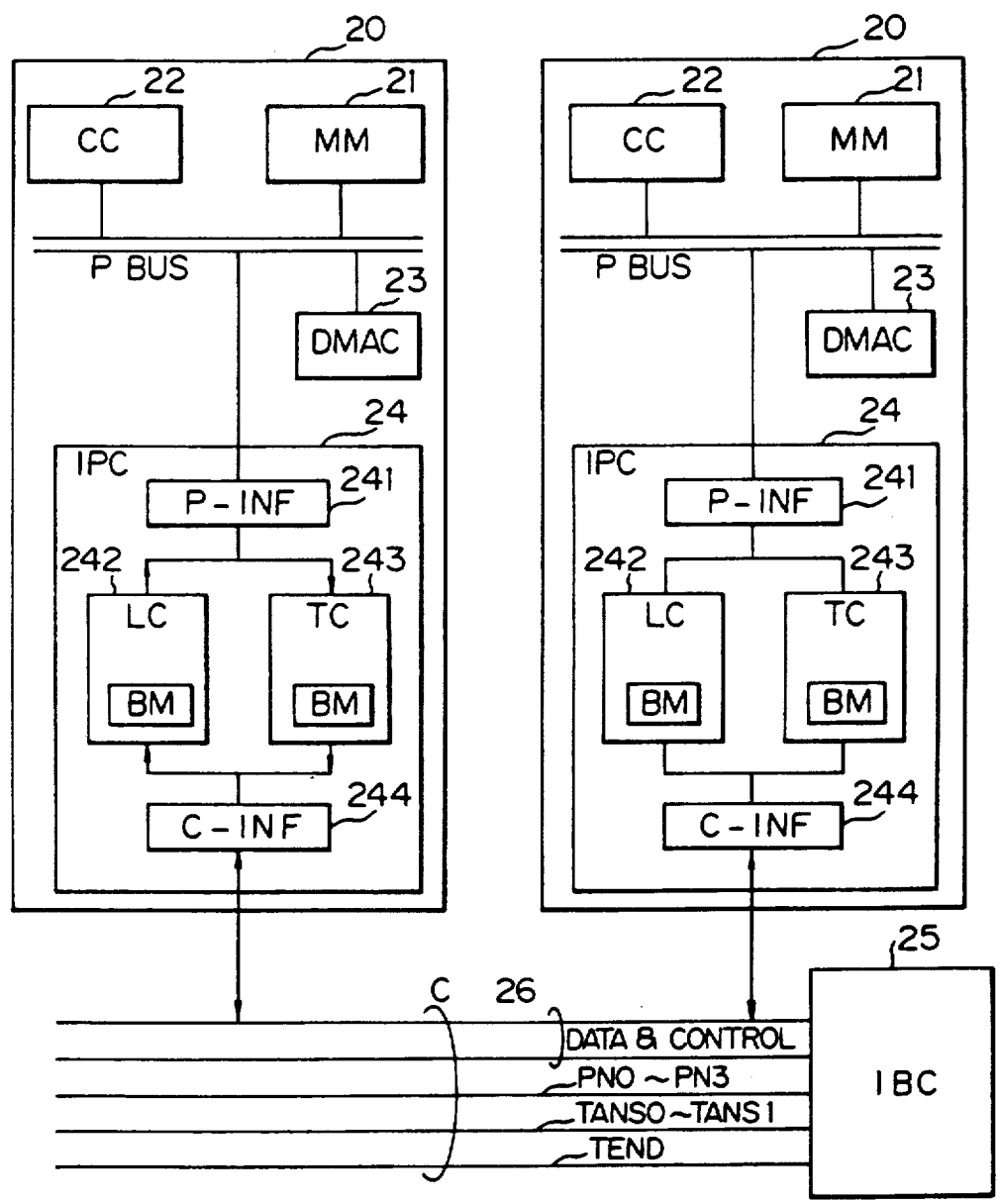
FIG. 5 is a diagram showing the construction of the bus control system according to an embodiment of the present invention.
Figure 6:
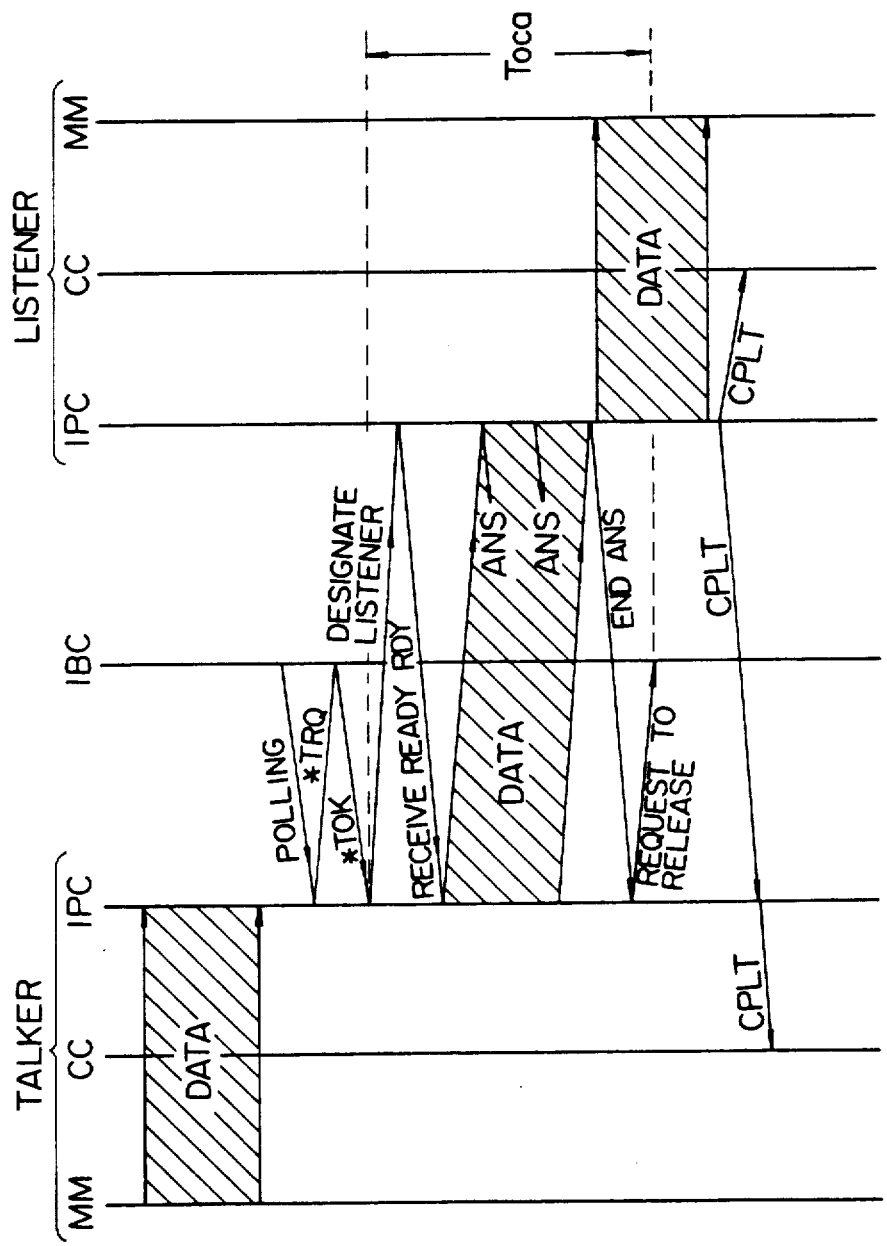
FIG. 6 is a diagram showing an operation sequence of an inter-multiprocessor communication, according to an embodiment of the present invention.
Figure 7:
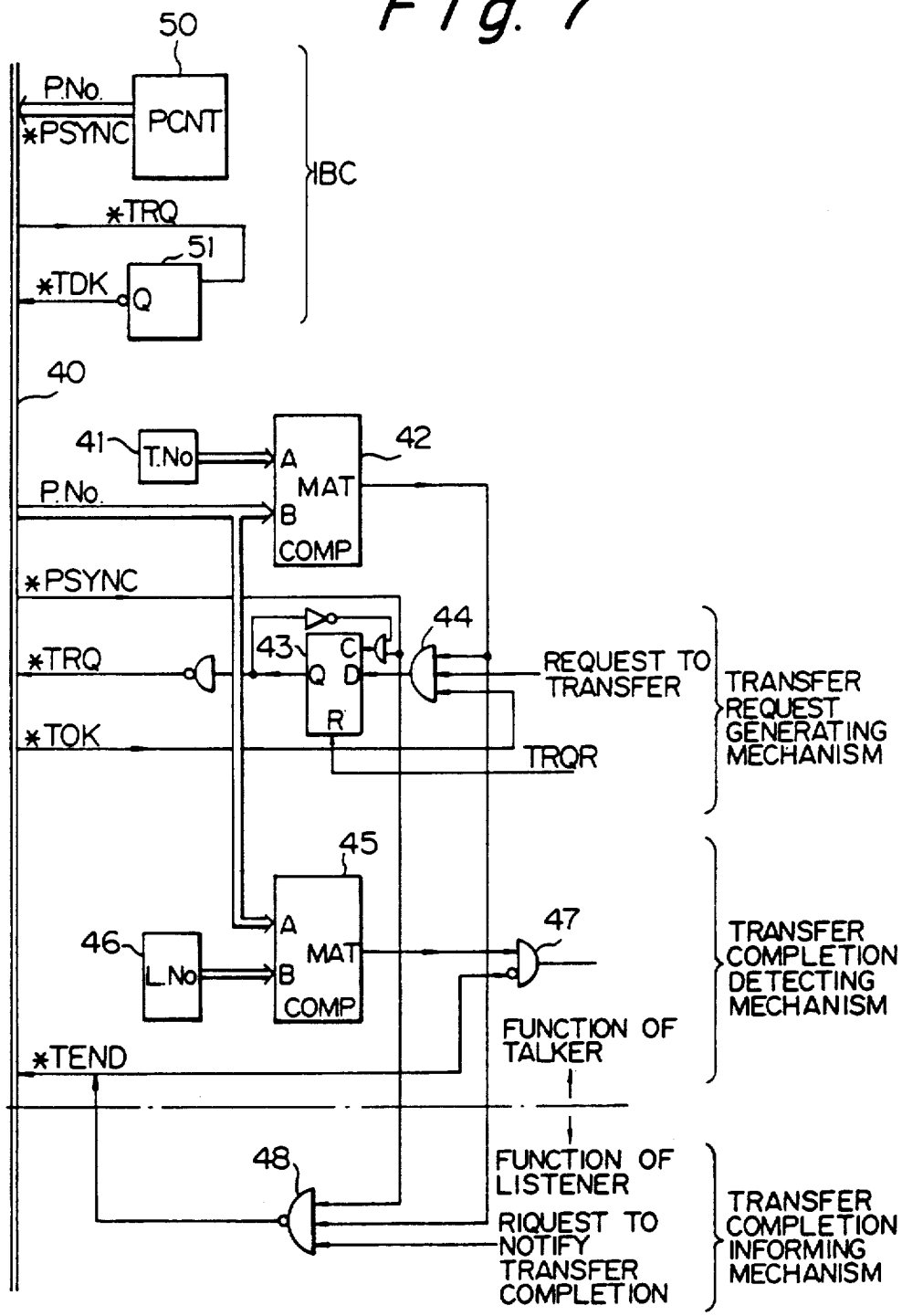
FIG. 7 is a construction diagram of a main portion of a communication bus interface in an inter-multiprocessor controller and a main portion of an inter-multiprocessor bus controller, according to an embodiment of the present invention.

FIG. 5 is a construction diagram of the bus control system according to an embodiment of the present invention, FIG. 6 is an operation sequence of the embodiment, and FIG. 7 is a construction diagram of a main portion of a communication bus interface of the inter-multiprocessor controller.

In FIG. 5, 20 represents a processor, 21 a main memory (MM), 22 a central control unit (CC), 23 a direct memory access controller (DMAC), 24 an inter-multiprocessor controller (IPC), 25 a inter-multiprocessor bus controller (IPC), and 26 a communication bus (C bus). Note that a p BUS in each processor is a processor bus.

In the inter-multiprocessor controller (IPC) 24 in FIG. 5, a p bus interface (P-INF) 241 is connected to the p bus to carry out an interface control with the central control unit (CC) 22, the main memory (MM) 21, and the DMAC 23; a talker control unit (TC) 243 has an internal buffer memory (BM) for storing transmitting data and carries out a transmission control of data to other processors.

A listener control unit (LC) 242 controls receipt of data from other processors, similarly having an internal buffer memory (BM) for storing the received data which are transferred, after receiving, to the main memory (MM) 21 through the p bus. A C-bus interface (C-INF) 244 is connected to he communication bus (C bus) 26 to carry out an interface control with the inter-multiprocessor bus controller 25 and the inter-multiprocessor controllers (IPCs) 24 in the other processors.

In the communication bus 26, data and control lines and polling lines PN0-PN3, which are conventionally provide, are provided. By the four lines, the number of 0 to 15 of the inter-multiprocessor controllers IPCs is represented. Also, according to the present invention, two listener response signal lines TANS 0 and 1 and one transfer completion signal line TEND are added.

FIG. 6 is an operation sequence of the bus control system shown in FIG. 5, the left-hand side of FIG. 6 representing the operation of each unit in the talker side, the right-hand side representing the operation of each unit in the listener side, and the central portion representing the operation of the inter-multiprocessor bus controller (IBC) 25.

Generally explaining the sequence shown in FIG. 6, after data is transferred from the main memory (MM) 21 in the talker to the inter-multiprocessor controller (IPC) 24 by the control of the DMAC 23, if a polling signal designating the number of this talker is output from the IBC 25, a request *TRQ to use the communication bus 26 from the talker is accepted by the IBC 25. In response to this, the IBC 25 transmits an allowance *TOK to use the communication bus to the talker. The IPC 24, which detects this, transmits a listener designating number (the number to identify the IPC at the receiving side) to the communication bus 26. When it is received by the corresponding opposite IPC (listener), it transmits a receive ready signal RDY, indicating that the receive ready is finished so that the reception by the listener is possible, to the listener response signal lines TANS 0 and 1. The listener response signal lines are constituted by two lines so that one of the codes constructed by 2 bits (there are four possibilities) is allocated to the signal indicating the receive ready completion.

The IPC 24 in the talker side, which receives the receive ready completion signal RDY, starts to transfer data through the data bus in the communication bus. At each data transfer of a predetermined unit (for example one word or one byte), the IPC 24 at the listener outputs an answer signal ANS (which is a 2-bit code different from the above-mentioned answer signal indicating the reception is possible) through the above-mentioned listener response signal lines TANS 0 and 1 to the talker. When the reception of the final data is finished, a predetermined 2-bit code is output as an end answer signal END ANS to the listener response signal lines TANS 0 and 1.

When the IPC 24 in the talker receives this end answer signal END ANS, a request to release the communication bus is sent from the IPC 24 at the talker to the IBC 25. Thereby, the request to use the bus which has been output by this time is released. Namely, when the inter-multiprocessor bus controller (IBC) 25 detects the request to release, the right to use the communication bus which has been given to the talker is released so that the bus can be used by other processors.

In the IPC 24 in the listener, after reception of the final data from the talker, the data received from the talker and stored in the buffer memory BM is transferred to the main memory (MM) 21 under the control of the DMAC 23. After completion of the DMA transfer, the IPC 24 at the listener outputs a transfer complete signal *TEND to the transfer completion signal line TEND when the the polling signal indicates the number of its own unit. Simultaneously, the IPC 24 in the listener sends a transfer complete signal *TEND to the central control unit (CC) 22 in the listener. By detecting the transfer completion signal *TEND in the talker, it can be known that the data is normally transferred from the buffer memory BM to the main memory (MM) 21 in the listener, so that a transfer complete signal *TEND is sent from the IPC 24 to the CC 22 in the talker.

In this way, since the transfer completion signal *TEND is output from the listener at the timing of the polling signal of the listener, the polling signal continues to indicate the numbers of units without stopping even during data transmission. Note, however, that, during data transmission through the communication bus, even when a transfer request is generated from another IPC, the transfer allowance is not issued.

In the listener, when the transfer from the buffer memory BM to the main memory (MM) 21 is not normally completed, a transfer completion signal *TEND is not generated from the IPC in the listener. In this case, the IPC in the talker does not receive the transfer completion signal *TEND so that the talker detects an abnormal condition, and an operation of retransfer and so forth is carried out.

As shown in FIG. 6, according to the embodiment of the present invention, the period Toca when the communication bus is occupied by the inter-multiprocessor controller IPC is from the reception of a transfer allowance signal*TOK to the reception of the end answer END ANS through the response answer signal lines. In contrast, in the conventional art, the occupation period Toc ends only after the data transfer in the listener is finished, as show in FIG. 3. Therefore, the period of occupying the bus according to the embodiment of the present invention can be shortened in comparison with the conventional example.

FIG. 7 shows a construction of the main portion of the communication bus interface (C-INF) 244 in the IPC and the main portion of the inter-multiprocessor bus controller (IBC) 25. In this construction, in he functions of the talker and the listener according to the present invention, a transmission request generating mechanism, a transfer completion detecting mechanism, and a transfer completion informing mechanism are mainly shown.

In FIG. 7, 40 is a communication bus (C bus), 41 a circuit for setting its own IPC number (talker number), 42 a circuit for comparing the polling number with its own polling number, 43 a flip flop circuit for generating a transfer request, 45 a circuit for comparing polling numbers for detecting a transfer completion, and 46 a listener-number setting circuit.

In the figure, the flip flop circuit 43 for generating the transfer request *TRQ, an AND circuit 44, and the related signal lines constitute the transfer request generating mechanism having the function of the talker. The comparing circuit 45, the listener number setting circuit 46, an AND circuit 47, and the related signal lines constitute the transfer completetion detecting mechanism having the function of the talker. Further, a NAND circuit 48 constitutes a transfer completion informing mechanism having the function of the listener.

The main portion of the inter-multiprocessor bus controller IBC includes a polling counter 50 which, in the example shown in FIG. 5, is a 4-bit counter for calculating the timing signal to generate the polling signal supplied to the four polling lines PN0–PN3, and generating a signal representing a number from 0 to 15. Simultaneous with this the synchronization signal *PSYNC representing the central position of each polling signal is generated and output to the communication bus 40. The polling signal continues to be generated even during the period when the communication bus is occupied by the IPC so that the data transfer operation is carried out. By this, after completion of the transfer operation in the listener, a listener response signal *TEND according to the present invention is notified to both the talker and the listener when the listener number is polled.

Reference 51 is a transfer request allowance flip flop circuit of a delay type, which outputs a transmission allowance signal *TOK to the communication bus when it receives a transfer request signal *TRQ from the communication bus. When the transfer request *TRQ from the IPC disappears at the end of the transfer, the output *TOK of the transfer request allowance flip flop circuit 51 is returned to "1".

The operation of the circuit shown in FIG. 7 is described with reference to FIG. 4A to FIG. 4G. In operation, when the IPC operates as a talker, a transfer request signal *TRQ of "0" is supplied to the AND circuit 44, and a polling number P.No which is supplied from the counter 50 to the communication bus 40 is compared with its own polling number by the comparing circuit 42. When they coincide, an output is supplied to the AND circuit 44. The transfer allowance (which is the same as the use allowance) signal represented by *TOK from the flip flop circuit 51 in the IBC through the communication bus 40 is "1" when a transfer allowance is not generated for another IPC. Accordingly, when another IPC does not carry out a transfer, and when a request to transfer of "1" is input to the AND circuit 44, the request to transfer is passed through the AND circuit 44 so that the transfer request flip flop circuit 43 is reset at the timing of the polling synchronization signal *PSYNC. The output of the flip flop circuit 43 is then inverted to transmit a transfer request signal *TRQ of "0" (L level) to the inter-multiprocessor bus controller IBC. Note that the polling synchronization signal *PSYNC is output from the inter-multiprocessor bus controller synchronized with the center of the polling signal.

When the transfer allowance signal *TOK of "0" (L level) is informed from the inter-multiprocessor bus controller, a listener number of an opposite party for communication is transmitted from a non-illustrated circuit to the data lines in the communication bus 40. At this time, the listener number is set in the listener number setting circuit 46.

When the data transmission between the IPC in the talker and the IPC in the listener is carried out and finished, an end answer signal END ANS is informed from the listener IPC in the opposite party to the talker IPC through listener response signal lines (which are not shown in FIG. 7), according to the present invention.

In the IPC in the talker, when an end answer signal END ANS is received from the listener response signal lines, it generates a transfer request end signal TRQR which is input to a reset terminal of the flip flop circuit 43 to return it to a reset state, and the transfer request signal *TRQ output from the transfer request flip flop circuit 43 is changed to "1" to indicate a state in which the transfer request is withdrawn. In response to the change of the transfer request signal *TRQ, the flip flop circuit 51 in the IBC changes the transfer allowance signal *TOK to "1". By this, it becomes possible for the inter-multiprocessor bus controller to accept a transfer request from another IPC.

On the other hand, in the IPC in the listener, after transmitting an end answer signal END ANS by the listener response signal lines, data transfer is effected in the listener processor from the buffer memory BM to the main memory MM by direct memory access control. When the transfer is normally completed, a request to notify the transfer completion is generated.

Namely, if the construction in FIG. 7 is the IPC in the listener side, he request to notify the transfer completion is supplied to the NAND circuit 48. The NAND circuit 48 provides a "0" signal representing a transfer completion *TEND to a singe transfer completion signal line (also represented by *TEND) only when the polling number comparing circuit 42 outputs a coincidence signal after comparing the polling signal with its own polling number, and when a polling synchronization signal *PSYNC is generated.

In the IPC in the talker side, the state of the transfer completion signal line *TEND is inverted and supplied to the AND circuit 47. At this time, when the polling signal on the communication bus outputs the number set in the listener number setting circuit 46, a coincidence signal is generated so that "1" representing a transfer completion is generated from the AND circuit 47. This signal is supplied to the central processing unit CC (see FIG. 5), informing it that the transfer is normally completed.

From the foregoing description it will be apparent that, according to the present invention, in a communication among a plurality of processors, since the bus occupation period used by one communication can be shortened, the efficiency in using the communication bus can be improved.

What is claimed is:

1. A bus control system comprising:
   a plurality of processors respectively connected to a data bus system, for controlling communication between said processors by polling, each of said processors including a main memory for storing data, a central control unit, and an inter-multiprocessor controller having a talker circuit and a listener circuit,
   said data bus system including at least one listener response signal line (TANS0, TANS1) and a transfer completion signal line (TEND) operating as bus control signal lines;
   data transferring means for occupying said data bus system by transferring data from the talker circuit of the inter-multiprocessor controller in one of said processors to the listener circuit of the inter-multiprocessor controller in another one of said processors through said data bus system;
   end answer signal transferring means for transferring an end answer signal (END ANS) from said listener circuit of the inter-multiprocessor controller of said one of the processors to said talker circuit of the inter-multiprocessor controller of another one of the processors through said listener response signal line when a transfer of data by said data transferring means is completed;
   bus occupation releasing means for releasing said data bus system from being occupied by said talker circuit when said end answer signal is received by said talker circuit;
   received data transferring means for transferring a received data within another one of the processors from the listener circuit to the main memory thereof after the data transfer from said talker circuit in one of said processors to said listener circuit in another one of said processors through said data bus system is completed; and
   transfer complete signal transferring means for transferring a transfer complete signal (CPLT) from said listener circuit of another one of the processors to said talker circuit of said one of the processors through said completion signal line (TEND), and from said inter-multiprocessor controller to said central control unit within said another one of said processors, after the received data is transferred within said another one of the processors from said listener circuit to said main memory thereof;
   said inter-multiprocessor bus controller, operatively connected through said data bus system to said plurality of processors, for generating a polling signal (PN0-PN3) for sequentially designating identification numbers of said plurality of processors without stopping even when said data bus system is occupied by one of said processors.

2. A bus control system as claimed in claim 1, wherein said transfer complete signal transferring means is included in each listener circuit, and said transfer complete signal is generated when said polling signal coincides with the identification number of said listener circuit.

3. A bus control system as claimed in claim 1, wherein each of said processors comprises transfer complete signal detecting means for detecting said transfer complete signal transferred from a respective listener circuit through said completion signal line, said transfer complete signal being detected when said polling signal coincides with an identification number of said respective listener circuit.

4. A bus control system as claimed in claim 1, where each of said processors comprises a transfer request signal generating means for generating a transfer request signal (TRO) when there is a request to transfer at the time a respective processor is polled.

5. A bus control system as claimed in claim 4, wherein said inter-multiprocessor bus controller comprises means for generating a use-allowance signal (TOK) in response to said transfer request signal (TRO) unless another processor occupies said data bus system, said use-allowance signal being supplied to said respective processor generating said transfer request signal, said use-allowance signal continuing until said transfer request signal is withdrawn in response to the generation of said end answer signal.

6. A bus control system as claimed in claim 5, wherein each of said processors comprises listener designating means for designating one of said processors as a listener, when said processor receives said use-allowance signal from said inter-multiprocessor bus controller.

7. A bus control system as claimed in claim 6, wherein each of said processors comprises receive-ready signal generating means for generating a receive-ready signal in response to said listener designation.

8. A bus control system as claimed in claim 1, wherein said received data transferring means comprises a direct memory access controller for transferring data by direct memory access control.

* * * * *